US012428027B2

(12) United States Patent
Singh

(10) Patent No.: US 12,428,027 B2
(45) Date of Patent: Sep. 30, 2025

(54) BEHAVIOR CHARACTERIZATION

(71) Applicant: GM Cruise Holdings LLC, San Francisco, CA (US)

(72) Inventor: Ishan Singh, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 412 days.

(21) Appl. No.: 17/950,969

(22) Filed: Sep. 22, 2022

(65) Prior Publication Data
US 2024/0101151 A1 Mar. 28, 2024

(51) Int. Cl.
*B60W 60/00* (2020.01)
*B60W 40/04* (2006.01)
*B60W 50/00* (2006.01)
*B60W 50/02* (2012.01)
*B60W 50/029* (2012.01)

(52) U.S. Cl.
CPC ........ *B60W 60/0011* (2020.02); *B60W 40/04* (2013.01); *B60W 50/0097* (2013.01); *B60W 50/0205* (2013.01); *B60W 50/029* (2013.01); *B60W 60/0015* (2020.02); *B60W 2050/0005* (2013.01); *B60W 2050/021* (2013.01); *B60W 2554/4044* (2020.02)

(58) Field of Classification Search
CPC ... B60W 2050/0005; B60W 2050/021; B60W 2554/4044; B60W 2556/10; B60W 40/04; B60W 50/0097; B60W 50/0205; B60W 50/029
See application file for complete search history.

(56) References Cited

U.S. PATENT DOCUMENTS

| | | | | |
|---|---|---|---|---|
| 11,691,634 | B1 * | 7/2023 | Zhou | B60W 50/0097 701/93 |
| 12,131,599 | B1 * | 10/2024 | Shah | G07C 5/10 |
| 2021/0009133 | A1 * | 1/2021 | McNew | B60W 40/09 |
| 2022/0194395 | A1 * | 6/2022 | Venkatadri | B60W 60/001 |
| 2022/0391423 | A1 * | 12/2022 | Uno | B60W 30/18 |
| 2023/0020040 | A1 * | 1/2023 | Tam | G08G 1/0141 |
| 2023/0406315 | A1 * | 12/2023 | Chreptyk | B60W 30/18159 |
| 2024/0166201 | A1 * | 5/2024 | Wang | B60W 60/0027 |

* cited by examiner

*Primary Examiner* — Wade Miles
*Assistant Examiner* — Zachary Joseph Wallace
(74) *Attorney, Agent, or Firm* — Honigman LLP; Matthew H. Szalach; Jonathan P. O'Brien

(57) ABSTRACT

Aspects of the subject technology relate to systems, methods, and computer-readable media for grouping behaviors based on behavior signatures. Event data gathered for an autonomous vehicle (AV) test is accessed. A signature for the AV behavior is identified from the event data. The signature is defined by features occurring during the AV behavior. The signature for the AV behavior is compared to signatures of one or more other AV behaviors. AV behaviors, including the AV behavior, are grouped together from a comparison of corresponding signatures across the plurality of AV behaviors.

16 Claims, 6 Drawing Sheets

BEHAVIOR CHARACTERIZATION

BACKGROUND

1. Technical Field

The present disclosure generally relates to grouping behaviors based on behavior signatures and, more specifically, to defining signatures for behaviors based on features of the behaviors and grouping the behaviors based on the corresponding behavior signatures.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
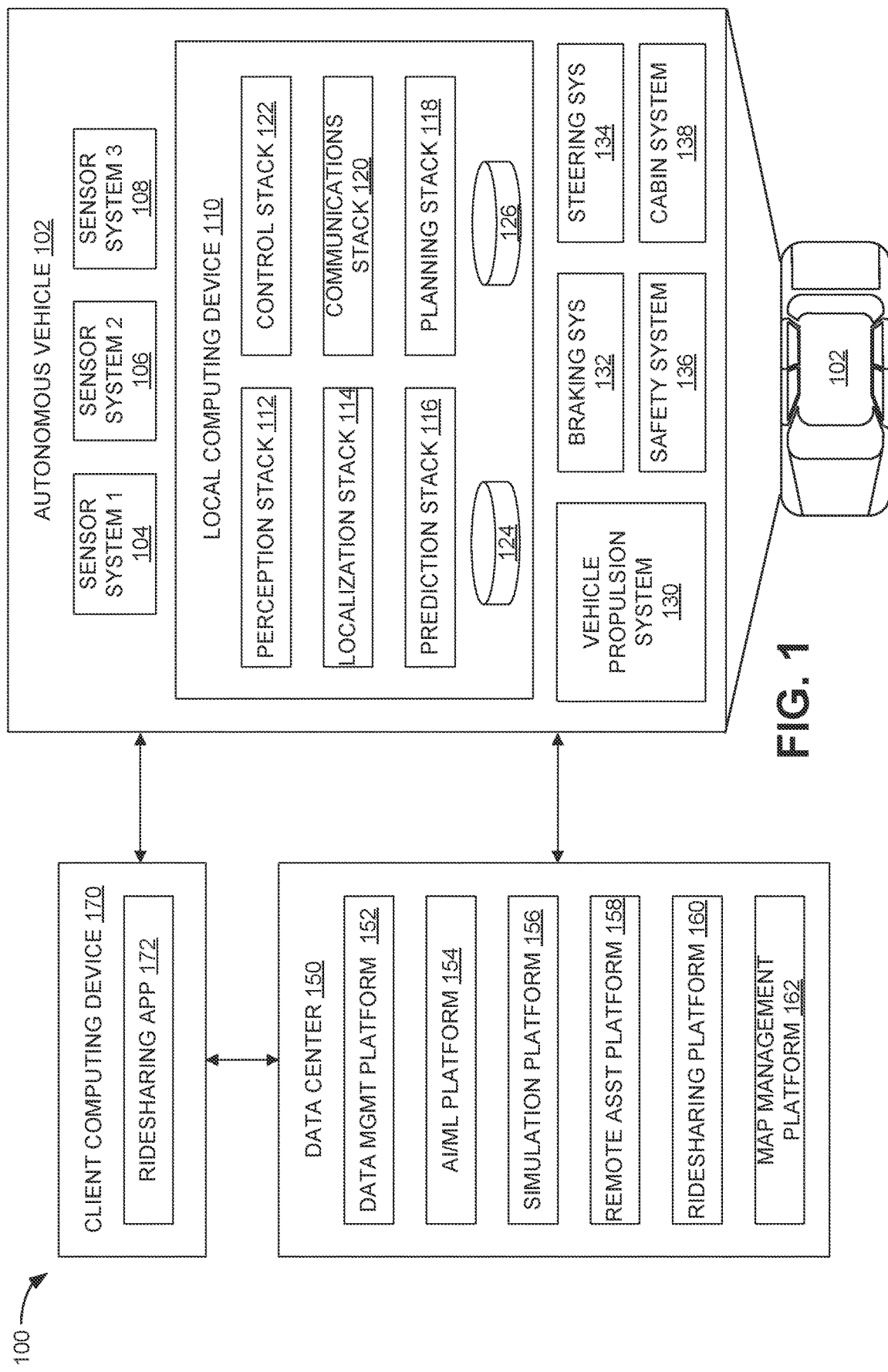
FIG. 1 illustrates an example system environment that can be used to facilitate autonomous vehicle (AV) dispatch and operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As discussed previously, an autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

A software stack can be used to control an autonomous vehicle. In particular, a software stack can include various dependent processes that can be implemented to control an autonomous vehicle. In developing autonomous vehicles, large amounts of data are generated during both test creation and replay, as well as during driving of the AV. Specifically, numerous tests are run that generate a large amount of data through the implementation of the software stack. As follows, faults found in or otherwise associated with the software stack can be identified from such information. In turn, the software stack and other applicable systems can be modified to account for such identified errors.

As large amounts of data are generated in association with controlling an AV, e.g. as part of both test event data and real world driving data, it becomes difficult to organize and selectively access subsets of the data. For example, as numerous tests are run it becomes difficult to organize and select specific tests for performing further analysis. Specifically, due to the large amounts of data generated during tests and the large number of tests, it becomes difficult to prioritize events and identify patterns in these failed events such that replay tests can be formulated that target these identified types of events. More specifically, due to the large amounts of data generated during tests and the large number of tests, it becomes difficult to identify similar tests (e.g., replay, real world, or other types of tests) to stress an observed failure pattern (e.g., evaluate that pattern for a set of metrics (e.g., comfort, safety, or other ride metrics)), which might individually be focused on testing a specific component of the stack but also addresses a specific class of behavior. Further, such large amounts of data make it difficult to identify errors for correction, e.g. in the software stack, from the tests.

For example, numerous tests exist that include events for performing a left hand turn. Among these tests is a subset of tests that include performing a left hand turn with a specific trajectory. However, it is difficult to parse through the large number of left hand turn tests and select the left hand turn tests that are performed at the specific trajectory, e.g. for comparing events to determine important failure patterns that need to addressed (even when on aggregate the AV is performing better than a previous version of the stack). Further, if an error occurred during a left hand turn at the specific trajectory, it is difficult to identify all of the tests that include the left hand turn at the specific trajectory, e.g. for purposes of troubleshooting.

The disclosed technology addresses the problems associated with grouping AV behaviors and comparing behaviors from large amounts of data by grouping behaviors based on signatures for the behaviors. In turn, behaviors can be processed and compared, e.g. to identify failure event trends, such that these trends can be addressed (e.g., through additional testing or other analysis). Additionally, errors or other characteristics of the behaviors can be troubleshooted based on the grouped behaviors, e.g. while operating more efficiently with a reduced event suite size. While the technology described herein is discussed with respect to AVs, the technology can be implemented for grouping behaviors for applicable systems and is not limited to AVs.

FIG. 1 is a diagram illustrating an example autonomous vehicle AV environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematics of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
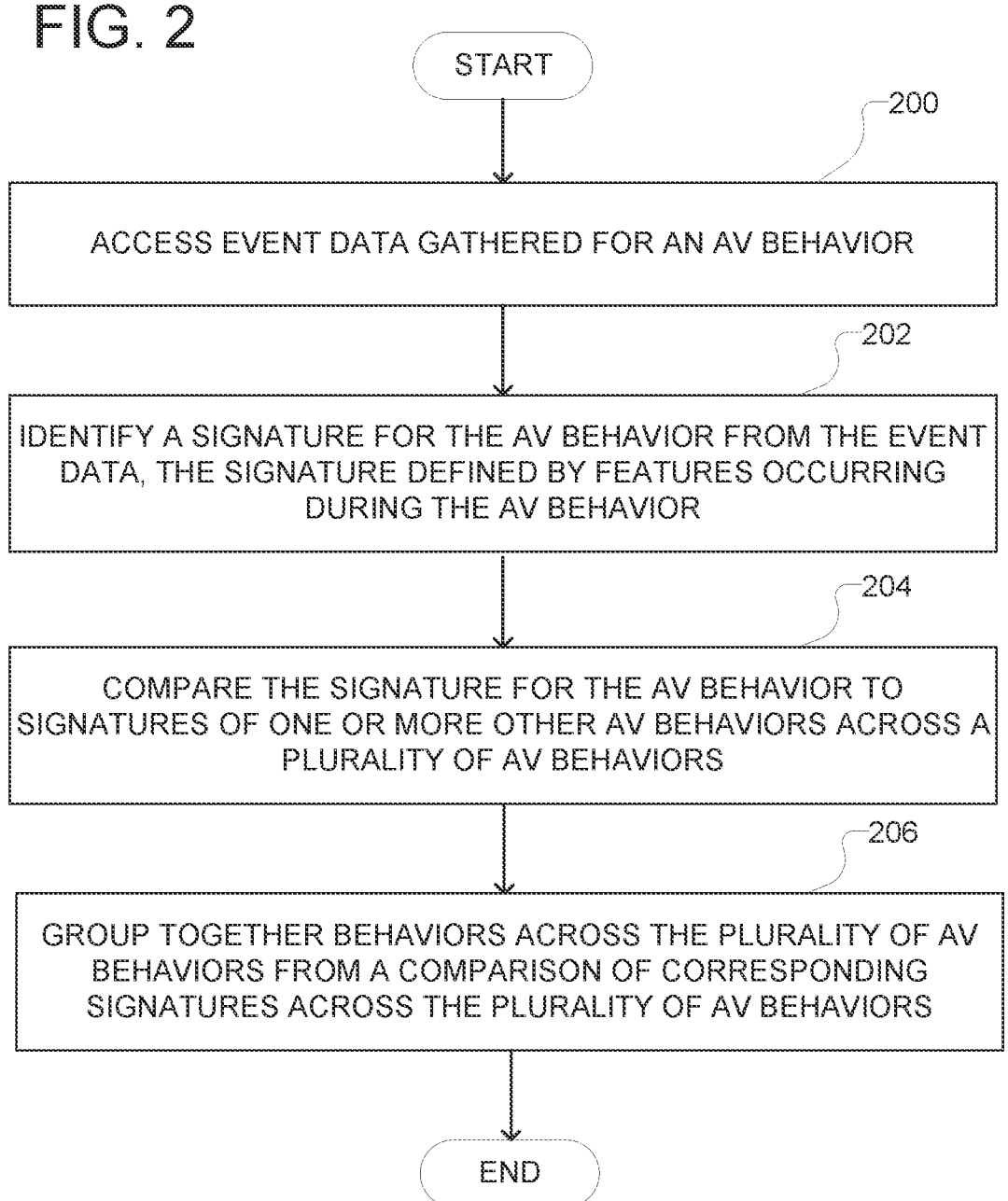
FIG. 2 illustrates a flowchart for an example method of grouping AV behaviors on behavior signatures, according to some examples of the present disclosure.

FIG. 2 illustrates a flowchart for an example method of grouping behaviors based on behavior signatures. The method shown in FIG. 2 is provided by way of example, as there are a variety of ways to carry out the method. Additionally, while the example method is illustrated with a particular order of operations, those of ordinary skill in the art will appreciate that FIG. 2 and the modules shown therein can be executed in any order and can include fewer or more modules than illustrated. Each module shown in FIG. 2 represents one or more operations, processes, methods or routines in the method.

At operation 200, event data gathered for an AV behavior is accessed. Event data can include applicable data that is gathered to describe a behavior of an AV. Specifically, event data can include data that is input to and output from various processes in an AV software stack for controlling an AV, e.g. as part of a test or a real world driving of the AV. For example, event data can include a path of a tracked object during a test, e.g. as determined by a perception stack/process. In another example, event data can include a path of an AV during a test, e.g. as determined by a localization stack/process. In yet another example, event data can include a trajectory of an AV suddenly stopping during a real-world driving instance.

An AV behavior can include a physical manner in which the AV acts during either or both simulated operation of the AV and real-world driving operation of the AV. Specifically, an AV behavior can include (or otherwise is) a maneuver that is performed by the AV during either a simulated operation or a real-world operation. For example, an AV behavior can include that an AV performed a right hand turn at a specific trajectory during real world operation. An AV behavior can include a context surrounding a physical manner of the AV. Context in relation to an AV behavior can include applicable circumstances that are associated with the behavior. Specifically, a context in relation to an AV behavior can include environmental characteristics occurring in conjunction with the AV behavior, conditions of the AV in conjunction with the AV behavior, and planned behaviors of the AV in relation to the AV behavior. For example, a context in relation to an AV behavior can include that an AV made a right turn at 30 degrees instead of 45 degrees. In another example, a context in relation to an AV behavior can include that the AV made a left hand turn at a specific intersection. In yet another example, a context in relation to an AV behavior can include that the AV was traveling at 30 miles per hour when it stopped.

Computations made by the AV, e.g. a software stack of the AV, message passing between various components of the AV, and specific output and input of various components of the AV can be indicative of, or otherwise serve as proxies to, classifying behaviors of the AV. For example, input to the control stack can be indicative of characteristics of specific behaviors/maneuvers or a class of behaviors/maneuvers that are ultimately performed by the AV. In another example, an output of a perception stack can be indicative of a specific tracked movement of an object or a class of tracked movement of an object. In turn, this tracked movement of the object can be indicative of maneuvers that will be performed by the AV.

Event data can be representative of features that occur during a specific behavior. A feature, as used herein with respect to a behavior, can include an applicable occurrence that happens during the behavior. A feature can be planned during a performed behavior, e.g. as part of a planned test. For example, a feature can be included as part of a plurality of features of an AV making a planned right hand turn. A feature can also be unexpected. For example, a feature can be part of a plurality of features associated with an object approaching an AV, and the AV making evasive maneuvers in the real world.

Behaviors and corresponding event data can have a temporal aspect. Specifically, behaviors occur over time as the AV is operated and simulated. In turn, the event data can represent behaviors and features of the behaviors that occur over time as the AV is operated on the road or simulated on a road, e.g. as part of a test. For example, event data can include the tracked movements of an object coming at an AV as part of an event during which the AV makes a right hand turn on the road. Event data can include data that is gathered by sensors of the AV, e.g. LIDAR data, camera image data, and camera video data. For example, event data can include raw data of an object tracked through LIDAR.

Event data can be generated based on running of a software stack as part of the AV being operated on the road or simulated during a test. Specifically, processes in a software stack can be run in sequential order. As follows, output of the processes running in the software stack can be recorded as part of event data. For example, control instructions generated by a control software stack can be included as part of output in the event data. In another example, multiple sets of one or more mechanical operations that the AV can perform as part of planning output of the planning stack can be included as part of the event data. Further, characteristics of the actual running of the processes can be recorded as part of event data. Additionally, input to the processes running in the software stack can be recorded as part of event data.

At operation 202, a signature for the AV behavior is identified from the event data. A signature of a test, as used herein, can include applicable features of the behavior that can distinguish the behavior from other behaviors, or otherwise characterize the behavior. For example, if a specific maneuver is performed by the AV as part of a specific behavior, then the signature of the behavior can reflect the specific maneuver that is performed. More specifically, if a unique feature/occurrence happened in relation to the specific maneuver, e.g. the specific maneuver was performed in a construction zone, then the signature can reflect that the specific maneuver was performed in a construction zone during the behavior.

In defining a signature of a behavior based on features, the signature can be defined by features that characterize the behavior. Specifically, features of a behavior can include characteristics of the behavior that distinguish the behavior from other behaviors and relate the behavior to other behaviors. For example, features can characterize an AV behavior as a right hand turn. Further in the example, features can characterize the right hand turn as a right hand turn that is performed at a specific time of day and at a specific location. In another example, features can characterize the behavior as a turn made at a specific degree. In yet another example, features can characterize the behavior as a number of detected pedestrians while an AV made a turn. In an example, features can characterize the behavior as a turn occurring at a specific intersection. In another example, features can characterize the behavior as movement out of a lane to avoid a speeding car coming from a rear of an AV. In yet another example, features can characterize the behavior as stopping at a stop sign within a specific number of feet to an intersection.

Features of a behavior that are used in defining a signature of the behavior can be characterized based on state transitions associated with the behavior. Specifically, features of the behavior can be characterized based on the state transitions indicated by the event data. A state transition can include when states of various aspects of processes that occur in performing a behavior change over time. For example, a state transition can include that a process that tracks an object shows a sudden change in the path of an object. In another example, a state transition can include that the speed of the AV suddenly changed. State transitions can be defined with respect to thresholds. Specifically, an aspect of a process can be compared to a threshold related to the aspect of the process. As follows, a state transition can be marked as occurring based on the aspect of the process in comparison to the threshold. For example, if the AV accelerates over a threshold amount, then the acceleration can represent a state transition.

Figure 3:
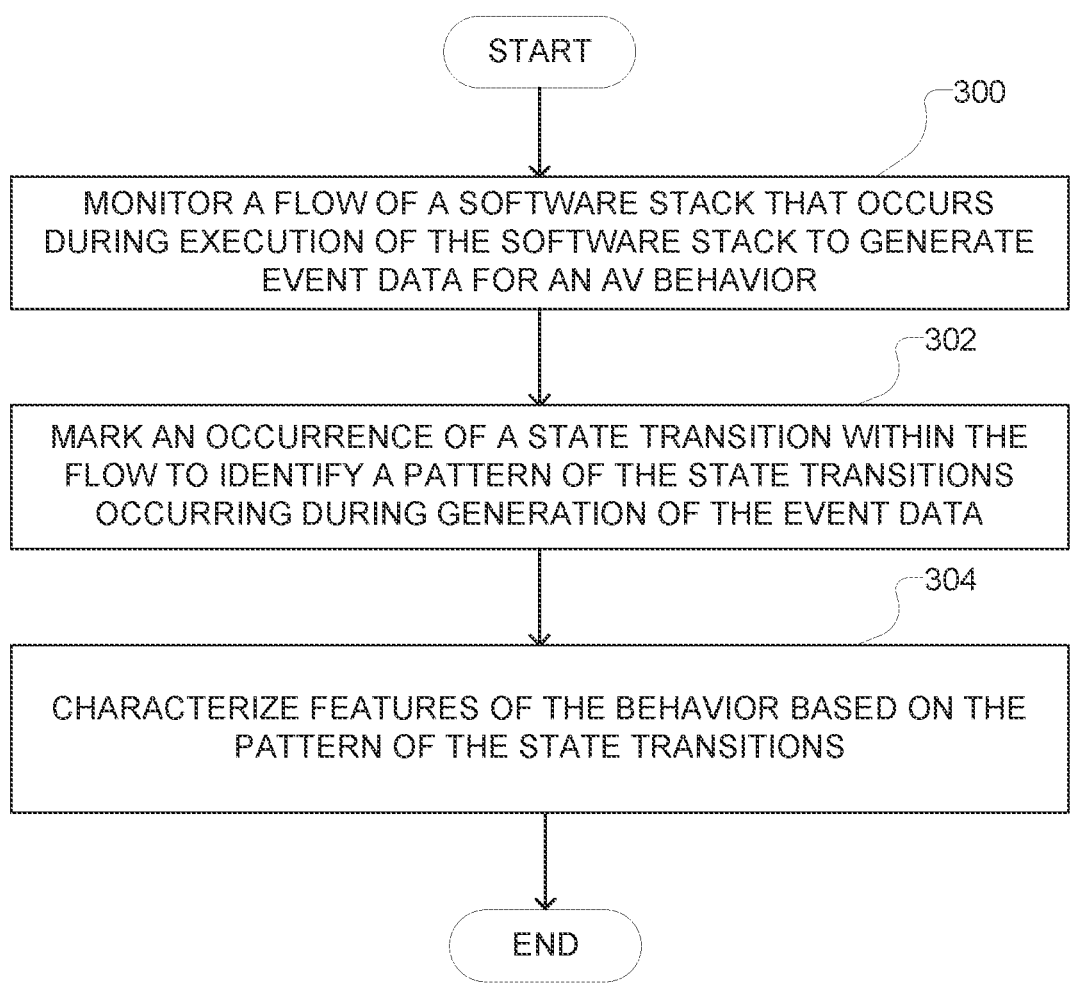
FIG. 3 illustrates a flowchart for an example method of tracking state changes in a software stack to characterize features of an AV behavior, according to some examples of the present disclosure.
Figure 4:
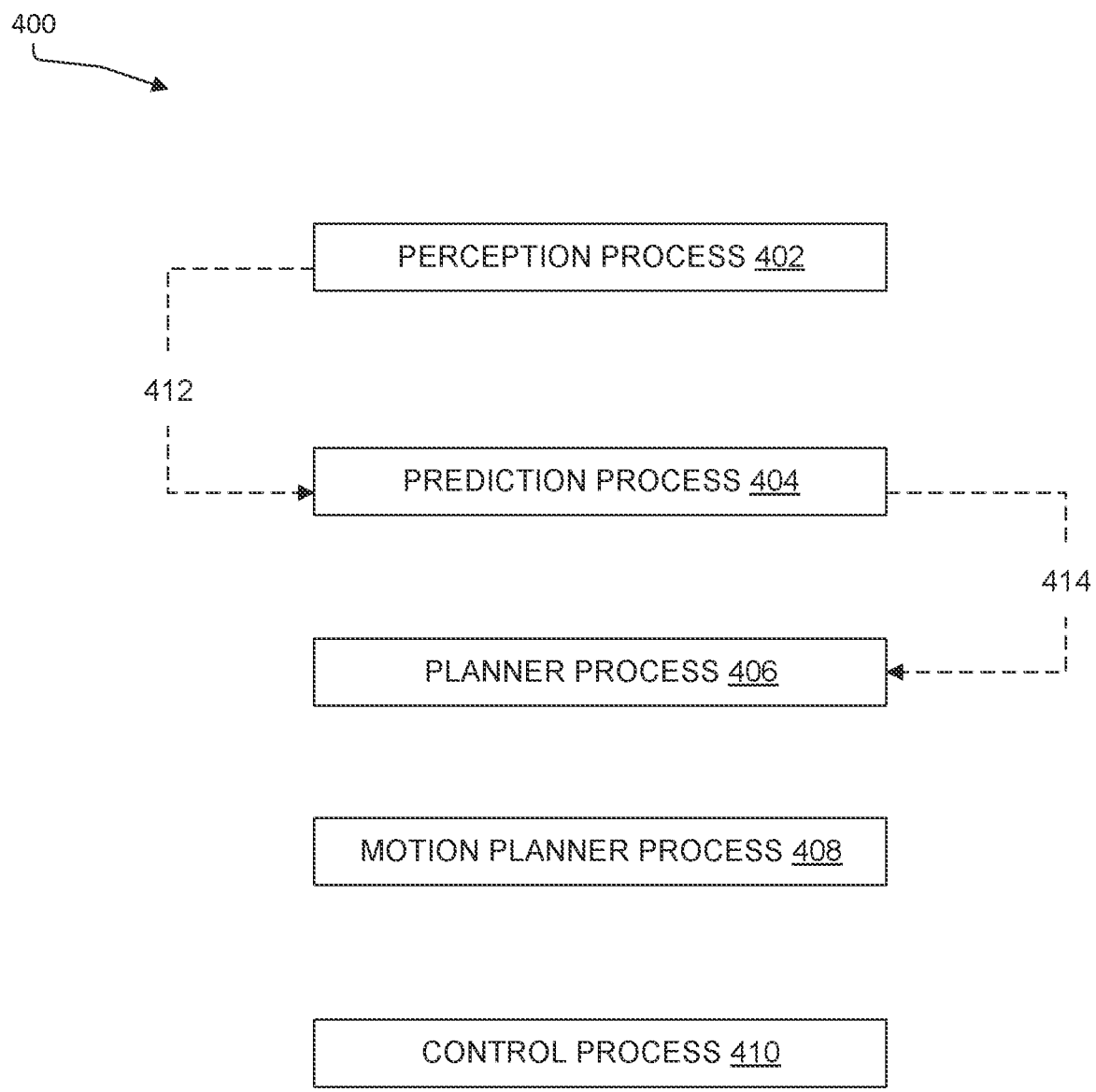
FIG. 4 illustrates an example AV software stack flow that is monitored in tracking state changes in the software stack, according to some examples of the present disclosure.

State transitions can be defined with respect to a software stack. Specifically, FIG. 3 illustrates a flowchart for an example method of tracking state changes in a software stack to characterize features of a behavior. FIG. 4 illustrates an example AV software stack flow 400 that is monitored in tracking state changes in the software stack. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

At operation 300, a flow of a software stack is monitored. Specifically, a flow of a software stack that occurs during execution of the software stack to generate event data for an AV behavior is monitored. The flow can include the processes and subprocesses that are executed either or both in serial and in parallel as part of executing the software stack.

With reference to the AV software stack flow 400 shown in FIG. 4, the example software stack includes applicable processes that can be used in controlling an AV, such as the stacks shown in FIG. 1. Specifically, the example AV software stack shown in FIG. 4 includes a perception process 402, a prediction process 404, a planner process 406, a motion planner process 408, and a control process 410.

The perception process 402 functions to access sensor data gathered by an AV. The perception process 402 can fuse the sensor data. From the sensor data, the perception process 402 can track objects. Specifically, the perception process 402 can identify where tracked objects are in a field of view, e.g. relative to the AV.

The prediction process 404 functions to predict where objects will be in a field of view. Specifically, the prediction process 404 can predict the location of objects that are not tracked by the perception process 402. The prediction process 404 can predict the location of objects based on the tracked object output of the perception process 402.

The planner process 406 functions to identify a path for the AV. Specifically, the planner process 406 functions to identify a path for the AV based on either or both the output of the perception process 402 and the prediction process 404. In identifying a path for the AV, the planner process can weigh various moves by the AV against costs with respect to the output of either or both the perception process 402 and the prediction process 404.

The motion planner process 408 functions to identify a refined path for the AV. In particular, the motion planner process 408 functions to identify a refined path for the AV with respect to the path identified by the planner process 406. A refined path developed by the motion planner process 408 can include a path that is planned according to smaller time operations and smaller distances in comparison to the scheme that is used to develop the path by the planner process 406.

The control process 410 functions to communicate with control systems of the AV to implement the plan developed by either or both the planner process 406 and the motion planner process 408. Specifically, the control process 410 can communicate values of parameters for controlling the AV to applicable systems for controlling the AV. For example, the control process 410 can specify to an acceleration controller of the AV to accelerate at 10%.

The flow 400 can include running the perception process 402 first. Then, at 412, the prediction process 404 is transitioned to and run. Specifically, the output of the perception process 402 can be fed, at 412, to the prediction process 404 as input. As follow, the flow 400 can continue with running the prediction process 404 from the input fed by the perception process 404. Then, at 414, the planner process 406 is transitioned to and run. Specifically, the output of the prediction process 404 can be fed, at 414, to the planner process 406 as input. This can continue down the stack until the control process 410 is run. This flow 400 can be monitored for state transition changes that occur during the execution of the processes or subprocess in the flow.

A state transition can be identified at an applicable level of granularity with respect to a test. In particular, a state transition can be identified at an applicable level of granularity with respect to a software stack for generating event data of a test. Specifically, a state transition can be identified at a topic level of a software stack. Additionally, a state transition can be identified at a field level of a software stack. While the description is made with reference to a software stack for robotics and AVs, the technology described herein can be applied to a software stack for an applicable system.

Returning back to FIG. 3, at operation 302, an occurrence of a state transition within the flow is marked. Specifically, an occurrence of a state transition can be marked during the flow to form part of a pattern of state transitions within the flow. An occurrence of a state transition within the flow can be marked through an applicable scheme or technique for forming a pattern of state transitions. For example, state transitions can be marked in a binary fashion to develop a pattern of state transitions. Further in the example, as an AV makes a right turn, a state transition can be marked as occurring with a 1. As follows, 0s can mark while the AV continues to make the right turn. Once the right turn is complete, then another 1 can be marked, thereby forming the pattern of state transitions.

The pattern of state transitions can be indicative of a behavior of the AV. With reference to the previously described example, the pattern of state transitions formed while the AV makes a right turn can be indicative of the behavior of the AV making and completing a right turn. As follows, the pattern of state transitions can be indicative of features that characterize the behavior. Accordingly, at operation 304, features of an AV behavior are characterized based on the pattern of state transitions. As discussed with respect to FIG. 2, these features can define a signature of the AV behavior.

As discussed previously, computations made by the AV, e.g. a software stack of the AV, message passing between various components of the AV, and specific output and input of various components of the AV can be indicative of, or otherwise serve as proxies to, features of behaviors of the AV. State transitions can represent computations, messaging between components, and specific output and input of components in association with operation of the AV. Accordingly, state transitions and the patterns formed by the state transitions can be indicative of features of AV behaviors. AV behaviors can be grouped based on state transitions, e.g. state transitions that correspond to features of the different AV behaviors. Accordingly, the AV behaviors can be grouped based solely on the state transitions and without characterizing the specific features of the different AV behaviors.

Referring back to FIG. 2, the signature for the AV behavior can be identified at operation 202 based on kinematic changes associated with the AV during the AV behavior. Specifically, features of the AV behavior can be characterized based on kinematic changes associated with the AV during the AV behavior. Kinematic changes associated with the AV during the AV behavior can include kinematic changes of the AV that occur during the AV behavior. Further, kinematic changes associated with the AV during the AV behavior can include kinematic changes that occur in the environment surrounding the AV during the AV behavior. For example, kinematic changes associated with the AV can include kinematic changes of objects, both tracked and predicted, during the behavior.

Figure 5:
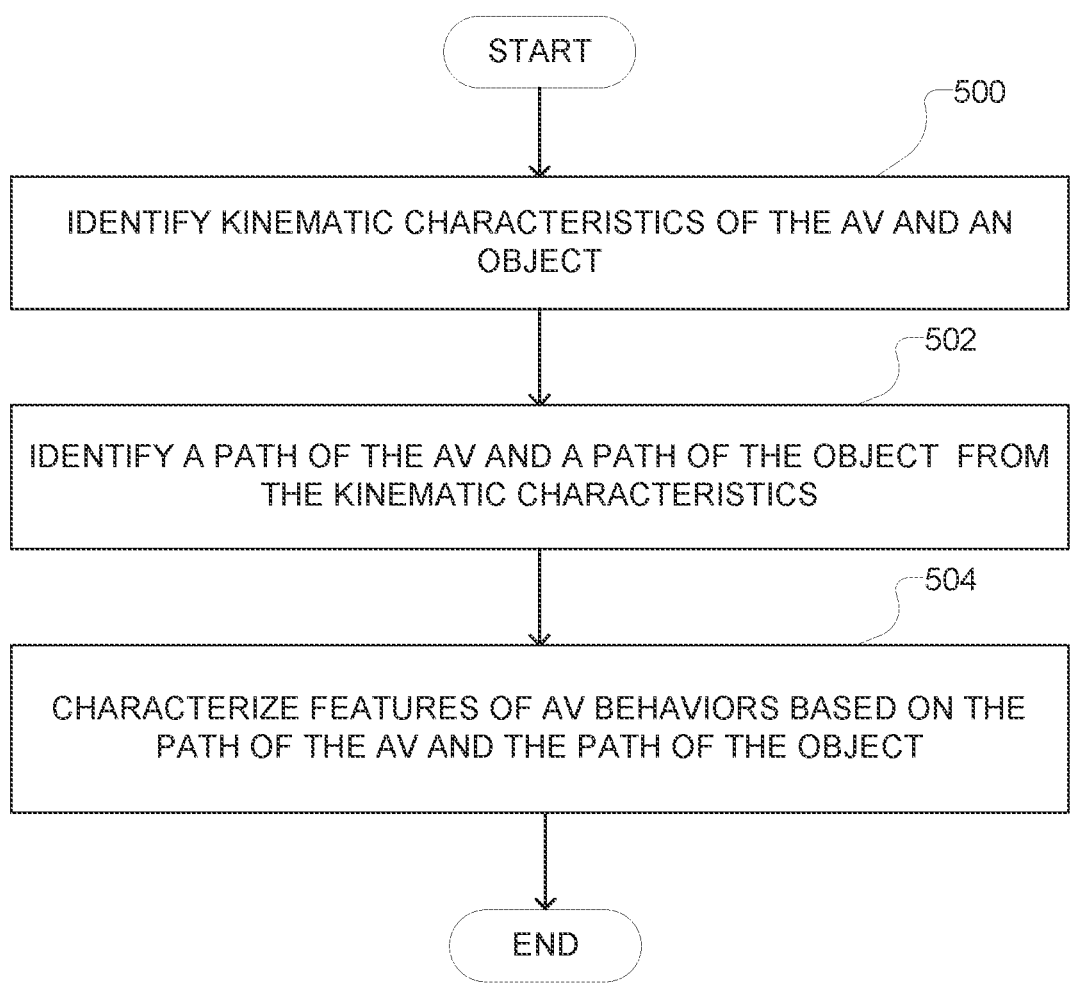
FIG. 5 illustrates a flowchart for an example method of characterizing features of an AV behavior based on kinematics, according to some examples of the present disclosure.

FIG. 5 illustrates a flowchart for an example method of characterizing features of AV behaviors based on kinematics. The method shown in FIG. 5 is provided by way of example, as there are a variety of ways to carry out the method. Additionally, while the example method is illustrated with a particular order of operations, those of ordinary skill in the art will appreciate that FIG. 5 and the modules shown therein can be executed in any order and can include fewer or more modules than illustrated. Each module shown in FIG. 5 represents one or more operations, processes, methods or routines in the method.

At operation 500, kinematic characteristics of the AV and an object are identified. The kinematic characteristics can include applicable features describing the movement of the AV and the object, e.g. in both a test environment and a real-world environment. The kinematic characteristics of the AV and the object can include characteristics that are actually tracked. Further, the kinematic characteristics of the AV and the object can include characteristics that are predicted. Specifically, the kinematic characteristics of the AV and the object can include characteristics describing real paths of the AV and the object and predicted paths of the AV and the object.

At operation 502, a path of the AV and a path of the object are identified from the determined kinematic characteristics. These paths can include both predicted and real paths of the AV and the object. Specifically, a predicted trajectory and real world trajectory of the AV that occurs during a specific behavior can be identified. Additionally, a predicted trajectory and the real world trajectory of the object that occurs during the specific behavior can be identified. For example, a trajectory of the AV and a trajectory of an object can be identified as the AV performs maneuvers to avoid the object.

At operation 504, features of AV behaviors are characterized based on the path of the object and the path of the AV, e.g. both predicted and real world paths of the AV and the object. Specifically, the path of the object and the path of the AV can be compared to identify features of the behaviors. For example, if the difference between the path of the object and the path of the AV is a certain amount, e.g. in relation to a threshold, then a corresponding feature of a behavior can be characterized based on this difference. For example, if the trajectory of the AV changes greatly in relation to a trajectory of a moving object towards the AV, then the behavior of the AV can be characterized as the AV trying to avoid the object.

Returning back to FIG. 2, at operation 204, a signature of the AV behavior is compared to signatures of one or more other AV behaviors. Specifically, features that define the signatures of the behaviors can be compared to each other in comparing the signatures of the behaviors. For example, a signature of a left hand turn behavior can be compared to a signature of other left hand turn behaviors.

At operation 206, behaviors are grouped together across the plurality of AV behaviors based on a comparison of the corresponding signatures of the behaviors. Specifically, behaviors are grouped together across the plurality of behaviors based on similarities between the signatures of the behaviors. More specifically, behaviors are grouped together based on similarities between features that define the signatures of the behaviors. For example, right hand behaviors that occur on a hill in the rain can be grouped together, e.g. across different tests or on road performances. In another example, the system could compare performance on hills without and with rain to identify systems within the stack that are having the biggest performance variations.

In grouping together behaviors based on similarities between corresponding signatures of the behaviors, the similarities relative to each other can be defined with respect to one or more metrics to group together the behaviors. Specifically, behaviors can be grouped together if their signatures meet a certain threshold level of similarity. For example, first and second behaviors can be grouped together if their corresponding signatures, when compared with each other, meet a 96% level of similarity.

Further, in grouping together behaviors based on similarities between corresponding signatures of the behaviors, the same behavior can be added to different groups of similar behaviors. For example, a right turn that is made in the rain at a specific intersection can be grouped into a group of behaviors that includes right hand turns at the specific intersection. Further, the right turn can be grouped into a different group of behaviors that includes right turns made in the rain.

By grouping specific behaviors across tests, a test suite can be dramatically reduced for analyzing test results. In particular, a test replay can be generated to include a specific behavior from a much smaller test suite, e.g. in comparison to all tests that include similar behaviors to the specific behavior. For example, all stopping behaviors that occur in construction zones can be grouped together instead of grouping together all behaviors that occur in construction zones.

Further, grouping specific behaviors can facilitate easier troubleshooting, e.g. of tests. Specifically, a subset of behaviors that are grouped together can be analyzed without analyzing all the event data that is gathered and associated with the behaviors. In turn, the processes that are associated with the subset of behaviors can be troubleshooted without troubleshooting every process that is performed in gathering the event data.

Figure 6:
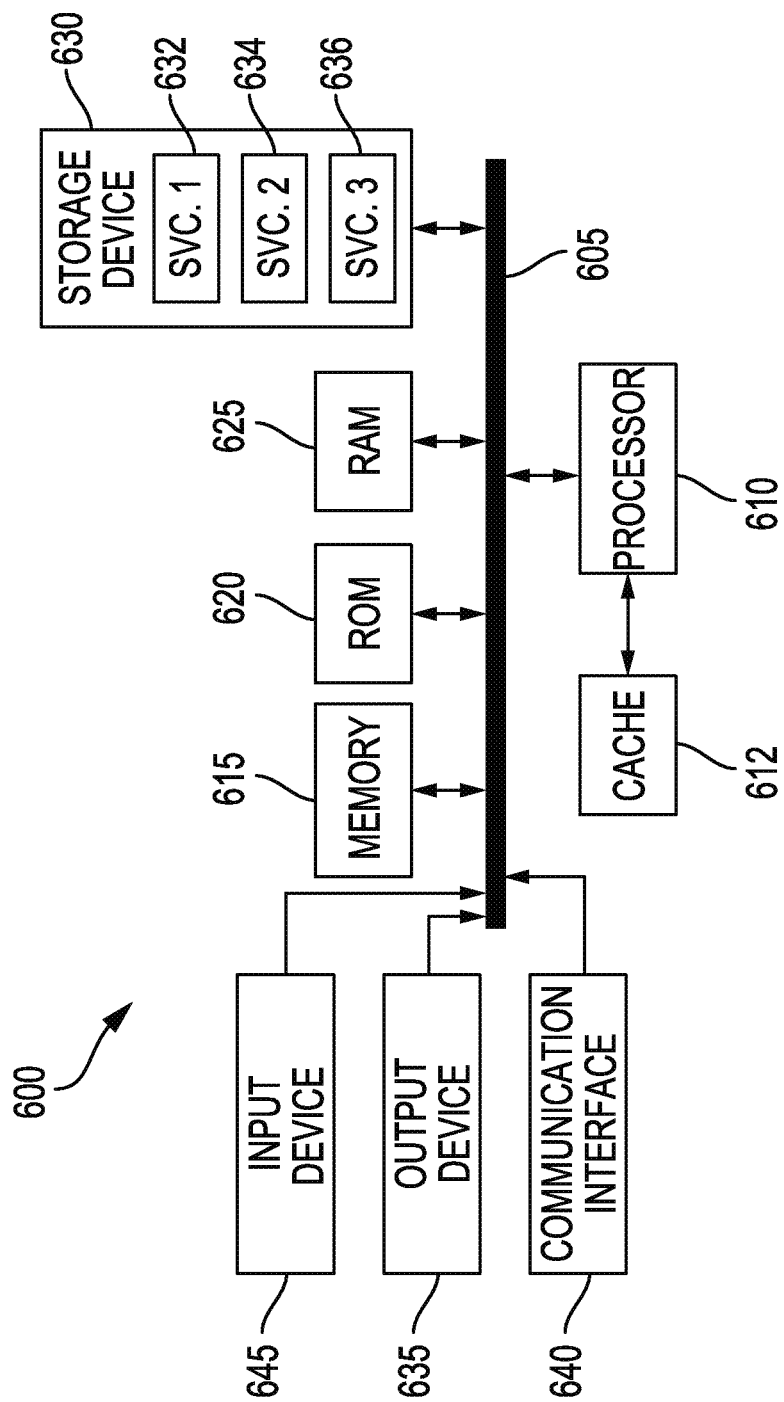
FIG. 6 illustrates an example processor-based system, according to some examples of the present disclosure.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing operations of the methods disclosed herein. The particular sequence of such executable instructions or associated data structures represents examples of corresponding acts for implementing the functions described in such operations.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: accessing event data gathered for an autonomous vehicle (AV) behavior; identifying a signature for the AV behavior from the event data, the signature defined by features occurring during the AV behavior; comparing the signature for the AV behavior to signatures of one or more other AV behaviors across a plurality of AV behaviors; and grouping together behaviors across the plurality of AV behaviors from a comparison of corresponding signatures across the plurality of AV behaviors based on similarities between features defining the corresponding signatures of the plurality of AV behaviors.

Aspect 2. The method of Aspect 1, wherein corresponding features defining the signature for the AV behavior are characterized based on state transitions occurring during generation of the event data.

Aspect 3. The method of Aspects 1 and 2, further comprising: monitoring a flow of a software stack that is executed to generate the event data during the AV behavior; marking an occurrence of a state transition within the flow to identify a pattern of the state transitions occurring during generation of the event data; and characterizing the corresponding features defining the signature for the AV behavior based on the pattern of the state transitions.

Aspect 4. The method of Aspects 1 through 3, wherein the state transition within the flow is identified at a topic level of the software stack.

Aspect 5. The method of Aspects 1 through 4, wherein the state transition within the flow is identified at a field level of the software stack.

Aspect 6. The method of Aspects 1 through 5, wherein corresponding features defining the AV behavior are characterized based on kinematic changes associated with the AV during the AV behavior.

Aspect 7. The method of Aspects 1 through 6, further comprising: identifying kinematic characteristics of the AV and an object during the AV behavior; identifying a path of the AV and a path of the object during the AV behavior from the kinematic characteristics; and characterizing the corresponding features of the AV behavior based on one or more of the real path of the AV, the predicted path of the AV, the real path of the object, and predicted path of the object.

Aspect 8. The method of Aspects 1 through 7, further comprising characterizing the corresponding features of the AV behavior based on a comparison between the path of the AV and the path of the object.

Aspect 9. The method of Aspects 1 through 8, further comprising: analyzing a subset of AV behaviors that are grouped together across the plurality of AV behaviors based on the similarities between the features defining the corresponding signatures of the plurality of AV behaviors; and facilitating troubleshooting of processes associated with the AV behaviors based on an analysis of the subset of AV behaviors.

Aspect 10. A system comprising: one or more processors; and at least one computer-readable storage medium having stored therein instructions which, when executed by the one or more processors, cause the one or more processors to: access event data gathered for an autonomous vehicle (AV) behavior; identify a signature for the AV behavior from the event data, the signature defined by features occurring during the AV behavior; compare the signature for the AV behavior to signatures of one or more other AV behaviors across a plurality of AV behaviors; and group together behaviors across the plurality of AV behaviors from a comparison of corresponding signatures across the plurality of AV behaviors based on similarities between features defining the corresponding signatures of the plurality of AV behaviors.

Aspect 11. The system of Aspect 10, wherein corresponding features defining the signature for the AV behavior are characterized based on state transitions occurring during generation of the event data.

Aspect 12. The system of Aspects 10 and 11, wherein the instructions further cause the one or more processors to: monitor a flow of a software stack that is executed to generate the event data during the AV behavior; mark an occurrence of a state transition within the flow to identify a pattern of the state transitions occurring during generation of the event data; and characterize the corresponding features defining the signature for the AV behavior based on the pattern of the state transitions.

Aspect 13. The system of Aspects 10 through 12, wherein the state transition within the flow is identified at a topic level of the software stack.

Aspect 14. The system of Aspects 10 through 13, wherein the state transition within the flow is identified at a field level of the software stack.

Aspect 15. The system of Aspects 10 through 14, wherein corresponding features defining the AV behavior are characterized based on kinematic changes associated with the AV during the AV behavior.

Aspect 16. The system of Aspects 10 through 15, wherein the instructions further cause the one or more processors to: identify kinematic characteristics of the AV and an object during the AV behavior; identify a path of the AV and a path of the object during the AV behavior from the kinematic characteristics; and characterize the corresponding features of the AV behavior based on one or more of the real path of the AV, the predicted path of the AV, the real path of the object, and predicted path of the object.

Aspect 17. The system of Aspects 10 through 16, wherein the instructions further cause the one or more processors to characterize the corresponding features of the AV behavior based on a comparison between the path of the AV and the path of the object.

Aspect 18. The system of Aspects 10 through 17, wherein the instructions further cause the one or more processors to: analyze a subset of AV behaviors that are grouped together across the plurality of AV behaviors based on the similarities between the features defining the corresponding signatures of the plurality of AV behaviors; and facilitate troubleshooting of processes associated with the AV behaviors based on an analysis of the subset of AV behaviors.

Aspect 19. A non-transitory computer-readable storage medium having stored therein instructions which, when executed by one or more processors, cause the one or more processors to: access event data gathered for an autonomous vehicle (AV) behavior; identify a signature for the AV behavior from the event data, the signature defined by features occurring during the AV behavior; compare the signature for the AV behavior to signatures of one or more other AV behaviors across a plurality of AV behaviors; and group together behaviors across the plurality of AV behaviors from a comparison of corresponding signatures across the plurality of AV behaviors based on similarities between features defining the corresponding signatures of the plurality of AV behaviors.

Aspect 20. The non-transitory computer-readable storage medium of Aspect 19, wherein the instructions further cause the one or more processors to: analyze a subset of AV behaviors that are grouped together across the plurality of AV behaviors based on the similarities between the features defining the corresponding signatures of the plurality of AV behaviors; and facilitate troubleshooting of processes associated with the AV behaviors based on an analysis of the subset of AV behaviors, Aspect 21. A system comprising means for performing a method according to any of Aspects 1 through 9.

What is claimed is:

1. A method comprising:
   accessing event data gathered for an autonomous vehicle (AV), the event data gathered during an operation of the AV and representing a behavior of the AV while the AV is performing the operation of the AV;
   identifying a signature for the AV behavior from the event data, the signature defined by features occurring during the AV behavior;
   comparing the signature for the AV behavior to signatures of one or more other AV behaviors across a plurality of AV behaviors; and
   grouping together AV behaviors across the plurality of AV behaviors based on comparisons of corresponding signatures across the plurality of AV behaviors based on similarities between features defining the corresponding signatures of the plurality of AV behaviors.

2. The method of claim 1, wherein the features defining the signature for the AV behavior are characterized based on state transitions occurring during generation of the event data.

3. The method of claim 2, further comprising:
   monitoring a flow of a software stack that is executed to generate the event data during the AV behavior;
   marking an occurrence of a state transition within the flow to identify a pattern of the state transitions occurring during generation of the event data; and
   characterizing the features defining the signature for the AV behavior based on the pattern of the state transitions.

4. The method of claim 1, wherein the features defining the AV behavior are characterized based on kinematic changes associated with the AV during the AV behavior.

5. The method of claim 4, further comprising:
   identifying kinematic characteristics of the AV and an object during the AV behavior;
   identifying a path of the AV and a path of the object during the AV behavior from the kinematic characteristics; and
   characterizing the features of the AV behavior based on one or more of a real path of the AV, a predicted path of the AV, a real path of the object, or a predicted path of the object.

6. The method of claim 5, further comprising characterizing the features of the AV behavior based on a comparison between the path of the AV and the path of the object.

7. The method of claim 1, further comprising:
   analyzing a subset of AV behaviors that are grouped together across the plurality of AV behaviors based on the similarities between the features defining the corresponding signatures of the plurality of AV behaviors; and
   facilitating troubleshooting of processes associated with the AV behaviors based on an analysis of the subset of AV behaviors.

8. A system comprising:
   one or more processors; and at least one computer-readable storage medium having stored therein instructions which, when executed by the one or more processors, cause the one or more processors to:
- access event data gathered for an autonomous vehicle (AV), the event data gathered during an operation of the AV and representing a behavior of the AV while the AV is performing the operation of the AV;
- identify a signature for the AV behavior from the event data, the signature defined by features occurring during the AV behavior;
- compare the signature for the AV behavior to signatures of one or more other AV behaviors across a plurality of AV behaviors; and
- group together behaviors across the plurality of AV behaviors from a comparison of corresponding signatures across the plurality of AV behaviors based on similarities between features defining the corresponding signatures of the plurality of AV behaviors.

9. The system of claim 8, wherein the features defining the signature for the AV behavior are characterized based on state transitions occurring during generation of the event data.

10. The system of claim 9, wherein the instructions further cause the one or more processors to:
- monitor a flow of a software stack that is executed to generate the event data during the AV behavior;
- mark an occurrence of a state transition within the flow to identify a pattern of the state transitions occurring during generation of the event data; and
- characterize the features defining the signature for the AV behavior based on the pattern of the state transitions.

11. The system of claim 8, wherein the features defining the AV behavior are characterized based on kinematic changes associated with the AV during the AV behavior.

12. The system of claim 11, wherein the instructions further cause the one or more processors to:
- identify kinematic characteristics of the AV and an object during the AV behavior;
- identify a path of the AV and a path of the object during the AV behavior from the kinematic characteristics; and
- characterize the features of the AV behavior based on one or more of a real path of the AV, a predicted path of the AV, a real path of the object, or a predicted path of the object.

13. The system of claim 12, wherein the instructions further cause the one or more processors to characterize the features of the AV behavior based on a comparison between the path of the AV and the path of the object.

14. The system of claim 8, wherein the instructions further cause the one or more processors to:
- analyze a subset of AV behaviors that are grouped together across the plurality of AV behaviors based on the similarities between the features defining the corresponding signatures of the plurality of AV behaviors; and
- facilitate troubleshooting of processes associated with the AV behaviors based on an analysis of the subset of AV behaviors.

15. A non-transitory computer-readable storage medium having stored therein instructions which, when executed by one or more processors, cause the one or more processors to:
- access event data gathered for an autonomous vehicle (AV), the event data gathered during an operation of the AV and representing a behavior of the AV while the AV is performing the operation of the AV;
- identify a signature for the AV behavior from the event data, the signature defined by features occurring during the AV behavior;
- compare the signature for the AV behavior to signatures of one or more other AV behaviors across a plurality of AV behaviors; and
- group together behaviors across the plurality of AV behaviors from a comparison of corresponding signatures across the plurality of AV behaviors based on similarities between features defining the corresponding signatures of the plurality of AV behaviors.

16. The non-transitory computer-readable storage medium of claim 15, wherein the instructions further cause the one or more processors to:
- analyze a subset of AV behaviors that are grouped together across the plurality of AV behaviors based on the similarities between the features defining the corresponding signatures of the plurality of AV behaviors; and
- facilitate troubleshooting of processes associated with the AV behaviors based on an analysis of the subset of AV behaviors.

* * * * *